US009922568B2

(12) United States Patent
Raynaud et al.

(10) Patent No.: US 9,922,568 B2
(45) Date of Patent: Mar. 20, 2018

(54) AIRCRAFT FLIGHT MANAGEMENT UNIT AND METHOD OF MONITORING SUCH A UNIT

(71) Applicant: Airbus Operations S.A.S., Toulouse (FR)

(72) Inventors: Sylvain Raynaud, Cornebarrieu (FR); Jean-Claude Mere, Verfeil (FR); Simon Sellem, Paris (FR)

(73) Assignee: Airbus Operations S.A.S. (FR)

( * ) Notice: Subject to any disclaimer, the term of this patent is extended or adjusted under 35 U.S.C. 154(b) by 0 days.

(21) Appl. No.: 15/351,852

(22) Filed: Nov. 15, 2016

(65) Prior Publication Data

US 2017/0148331 A1     May 25, 2017

(30) Foreign Application Priority Data

Nov. 25, 2015   (FR) .................................. 15 61334

(51) Int. Cl.
    *G05D 1/02*      (2006.01)
    *G08G 5/00*      (2006.01)
    *G05D 1/10*      (2006.01)

(52) U.S. Cl.
    CPC .......... *G08G 5/0039* (2013.01); *G05D 1/101* (2013.01); *G08G 5/003* (2013.01)

(58) Field of Classification Search
    CPC . G05D 1/00; G05D 1/02; B64D 43/00; G08G 5/00; G08G 5/0039; G08G 5/003
    USPC .......................................................... 701/3
    See application file for complete search history.

(56) References Cited

U.S. PATENT DOCUMENTS

| 8,649,920 | B2 | 2/2014 | Potagnik et al. |
| 9,139,289 | B2 | 9/2015 | Raynaud et al. |
| 9,368,035 | B2 | 6/2016 | Mere et al. |
| 2009/0112464 | A1* | 4/2009 | Belcher ................ G01C 21/165 701/414 |
| 2016/0078769 | A1* | 3/2016 | Coulmeau .............. G01C 21/20 701/537 |

FOREIGN PATENT DOCUMENTS

| FR | 2 968 784 A1 | 6/2012 |
| FR | 2 983 598 A1 | 6/2013 |
| FR | 3 010 542 A1 | 3/2015 |

OTHER PUBLICATIONS

FR 15 61334 Search Report dated Sep. 27, 2016.
(Continued)

*Primary Examiner* — Tan Q Nguyen
(74) *Attorney, Agent, or Firm* — Lerner, David, Littenberg, Krumholz & Mentlik, LLP

(57) ABSTRACT

A flight management unit includes two guidance subsystems each including a flight management system, each of the flight management systems being configured at least to extract a flight plan from at least one navigation database, to construct a flight trajectory, and to compute guidance commands for the aircraft. The flight management unit also includes at least one monitoring unit configured to compute a guidance command from a validated flight trajectory and a consolidated flight plan and to monitor the guidance command, as well as guidance commands computed by the two flight management systems so as to be able to detect and to identify a defective flight management system.

15 Claims, 2 Drawing Sheets

(56) References Cited

OTHER PUBLICATIONS

"Manuel de conception de procedures de qualite de navigation requise a autorisation obligatoire (RNP AR)", Organisation De L'aviation Civile Internationale (Dec. 31, 2009) Extrait de l'Internet: URL:http://www.icao.int/Meetings/PBN-Symposium/Documents/9905_cons_fr.pdf (Required Navigation Performance Authorization Required (RNP AR) Procedure Design Manual (http://www.icao.int/Meetings/PBN-Symposium/Documents/9905_cons_en.pdf).

* cited by examiner

US 9,922,568 B2

AIRCRAFT FLIGHT MANAGEMENT UNIT AND METHOD OF MONITORING SUCH A UNIT

FIELD OF THE INVENTION

The present invention concerns a flight management unit of an aircraft, in particular a transport aircraft, and a method of monitoring guidance set points generated by a flight management unit of this kind.

Although not exclusively, the present invention applies more particularly to an aircraft executing RNP AR (Required Navigation Performance with Authorization Required) operations. These RNP AR operations are based on RNAV (aRea NAVigation) type navigation and on RNP (Required Navigation Performance) operations. They have the particular feature of necessitating a specific authorization to be able to be executed on board an aircraft.

BACKGROUND OF THE INVENTION

It is known that the RNP concept corresponds to area navigation for which are added (on board the aircraft) monitoring and alert means that make it possible to ensure that the aircraft remains in an RNP corridor around a reference trajectory. Outside that corridor there are potentially terrain features or other aircraft. The performance required for an RNP type operation is defined by an RNP value that represents the half-width (in nautical miles: NM) of the corridor around the reference trajectory within which the aircraft must remain 95% of the time during the operation. A second corridor (around the reference trajectory) with a half-width twice the RNP value is also defined. The probability of the aircraft leaving this second corridor must be below $10^{-7}$ per flight hour.

The RNP AR operation concept is even more constraining. RNP AR procedures are in fact characterized by:
  RNP values which:
    are less than or equal to 0.3 NM on approach, and which may be as low as 0.1 NM; and
    are strictly less than 1 NM on departure and during refuelling, and may also be as low as 0.1 NM;
  a final approach leg that may be curved; and
  obstacles (mountains, traffic, etc.) that may be situated at twice the RNP value relative to the reference trajectory, whereas for the standard RNP operations an additional margin relative to the obstacles is provided.

The air traffic authorities have defined a target level of safety (TLS) of $10^{-7}$ per flight hour. In the case of RNP AR operations, as the RNP values may be as low as 0.1 NM and obstacles may be situated at twice the RNP value of the reference trajectory, this objective is reflected in a probability of the aircraft leaving the corridor of half-width $D=2 \cdot RNP$ that must not exceed $10^{-7}$ per flight hour.

The equipment on board an aircraft and notably the flight management unit must make it possible to achieve the target safety level if the aircraft has to use RNP AR type operations (Required Navigation Performance with Authorization Required).

The object is to have the capability to fly RNP AR procedures with RNP values up to 0.1 NM without restriction (in a normal situation and in the event of a malfunction) on departure, approach and refuelling.

Now, for an aircraft to have the capability to fly RNP AR procedures of this kind it is notably necessary to be able to eliminate from the guidance loop an erroneous source of computed guidance commands (or set points), in order to counter any effects thereof on the trajectory of the aircraft.

To be able to execute an RNP 0,1 type operation, the flight management unit must make it possible to comply with a "hazardous" type severity in the event of loss of or erroneous guidance set points. Moreover, in the event of detection of an erroneous computation, the aircraft must be able to continue to be guided automatically in order to be kept within the RNP corridor.

With a flight management unit with two flight management systems, in the event of a mismatch between the two flight management systems, the unit is not capable of identifying which of them is defective, and the aircraft can therefore no longer be guided automatically and is not in a position to execute RNP operations of this kind.

BRIEF SUMMARY OF THE INVENTION

An aspect of the present invention applies to a flight management unit comprising two guidance subsystems each including a flight management system (FMS).

An aspect of the present invention concerns an aircraft flight management unit enabling execution of the above RNP operations, said flight management unit comprising two guidance subsystems each including a flight management system, each of said flight management systems being configured at least to extract a flight plan from at least one navigation database, to construct a flight trajectory and to compute guidance commands for the aircraft, said flight management unit also comprising at least one monitoring system configured to monitor the flight management systems.

According to an embodiment of the invention, said monitoring unit includes:
  a monitoring system, said monitoring system comprising:
    a reception unit configured to receive a flight trajectory, constructed by one of said flight management systems, and a consolidated flight plan;
    a verification unit configured to verify if the flight trajectory received is valid taking account of the consolidated flight plan received, the flight management system that constructed the flight trajectory being considered defective if the flight trajectory is considered invalid by the verification unit; and
  a computation unit configured to compute, in the event of validation of the flight trajectory, a guidance command of the aircraft on the basis of this valid flight trajectory and a current position of the aircraft; and
  a comparison unit configured to compare the respective guidance commands computed by each of the two flight management systems and by said computation unit of the monitoring system so as to be able, if necessary, to detect and to identify a defective flight management system.

Thanks to this architecture, the monitoring system is therefore able to identify a defective flight management system in order to make it possible to guide the aircraft with the aid of a flight management system that is not defective, which (see below) makes it possible for the aircraft to have the capability to fly RNP type operations as referred to above and to solve the aforementioned problem.

Said monitoring unit advantageously includes a cross check unit for validating said consolidated flight plan with the aid of flight plans extracted by said flight management systems.

Moreover, the reception unit is advantageously configured to receive one of the following flight trajectories:

if one of said flight management systems is a master flight management system and the other of said flight management systems is a slave flight management system, the flight trajectory constructed by the master flight management system;

if not, of the respective flight trajectories constructed by the two flight management systems, the one that satisfies better a predetermined criterion.

Moreover, said each of said flight management systems and said monitoring system are advantageously hosted in different hardware.

Moreover, said flight management unit advantageously comprises at least one guidance computer and said comparison unit is integrated into said guidance computer.

The present invention also concerns a method of monitoring a flight management unit as described above.

According to an aspect of the invention, said monitoring method comprises the following successive steps:

a receiving step executed by a reception unit and consisting in receiving a flight trajectory constructed by one of said flight management systems and a consolidated flight plan;

a verification step executed by a verification unit and consisting in verifying if the flight trajectory received is valid taking account of the consolidated flight plan received, the flight management system that constructed the flight trajectory being considered defective if the flight trajectory is considered invalid;

a computation step executed by a computation unit and consisting, if the flight trajectory is considered valid, in computing a guidance command of the aircraft based on this valid flight trajectory and a current position of the aircraft; and a comparison step executed by a comparison unit and consisting in comparing the respective guidance commands computed by each of said flight management systems and the guidance command computed in said computation step so as to be able, if necessary, to detect and to identify a defective flight management system.

The receiving step advantageously consists in receiving the flight trajectory each time that this flight trajectory is modified.

Moreover, said method advantageously comprises a validation step consisting in determining said consolidated flight plan with the aid of flight plans extracted by said flight management systems. The validation step preferably consists in executing a cyclic redundancy check (CRC). The consolidated flight plan is the result of this validation step. Each flight management system preferably extracts its flight plan and computes a CRC code, the master flight management system sends its flight plan and the CRC code to the monitoring system, the slave flight management system may send only the CRC code, and the monitoring system verifies that the two CRC codes are equivalent. If so, the flight plan received from the master flight management system is validated; if not, the monitoring system asks again for extraction by the two flight management systems, and if after several attempts the CRC codes are still not equivalent, the operation is cancelled.

Moreover, the verification step advantageously consists in constructing an RNP type corridor around the flight plan and verifying if the flight trajectory is situated inside that corridor. The verification step preferably consists in:

determining the leg of the flight plan to which belongs a sample of the verified flight trajectory, the leg determined in this way being considered as a computation leg;

computing a cross track between this flight trajectory sample and said computation leg of the flight plan;

comparing this cross track to a field of possible values depending at least on an RNP value, the preceding steps being executed for a plurality of samples; and validating the flight trajectory if, for all the samples considered, the cross tracks are situated inside the corresponding fields of values.

The field of values for a cross track advantageously corresponds to:

[−RNP; +XTKmax], XTKmax being a maximum value depending on two successive rectilinear legs, if the flight trajectory part considered comprises said two non-aligned successive rectilinear legs; and

[−RNP; +RNP] otherwise.

Moreover, and advantageously:

the computation step utilizes a consolidated position as the current position of the aircraft to compute the guidance command; and/or the comparison step consists in exercising a vote between the respective guidance commands computed by each of said flight management systems and the guidance command computed in said computation step and retaining the median value.

The present invention also concerns an aircraft, in particular a transport aircraft, that is provided with a flight management unit such as that specified above.

BRIEF DESCRIPTION OF THE DRAWINGS

The appended figures will clearly explain how the invention can be reduced to practice. In these figures, identical references designate similar elements. More specifically.

DETAILED DESCRIPTION

Figure 1:
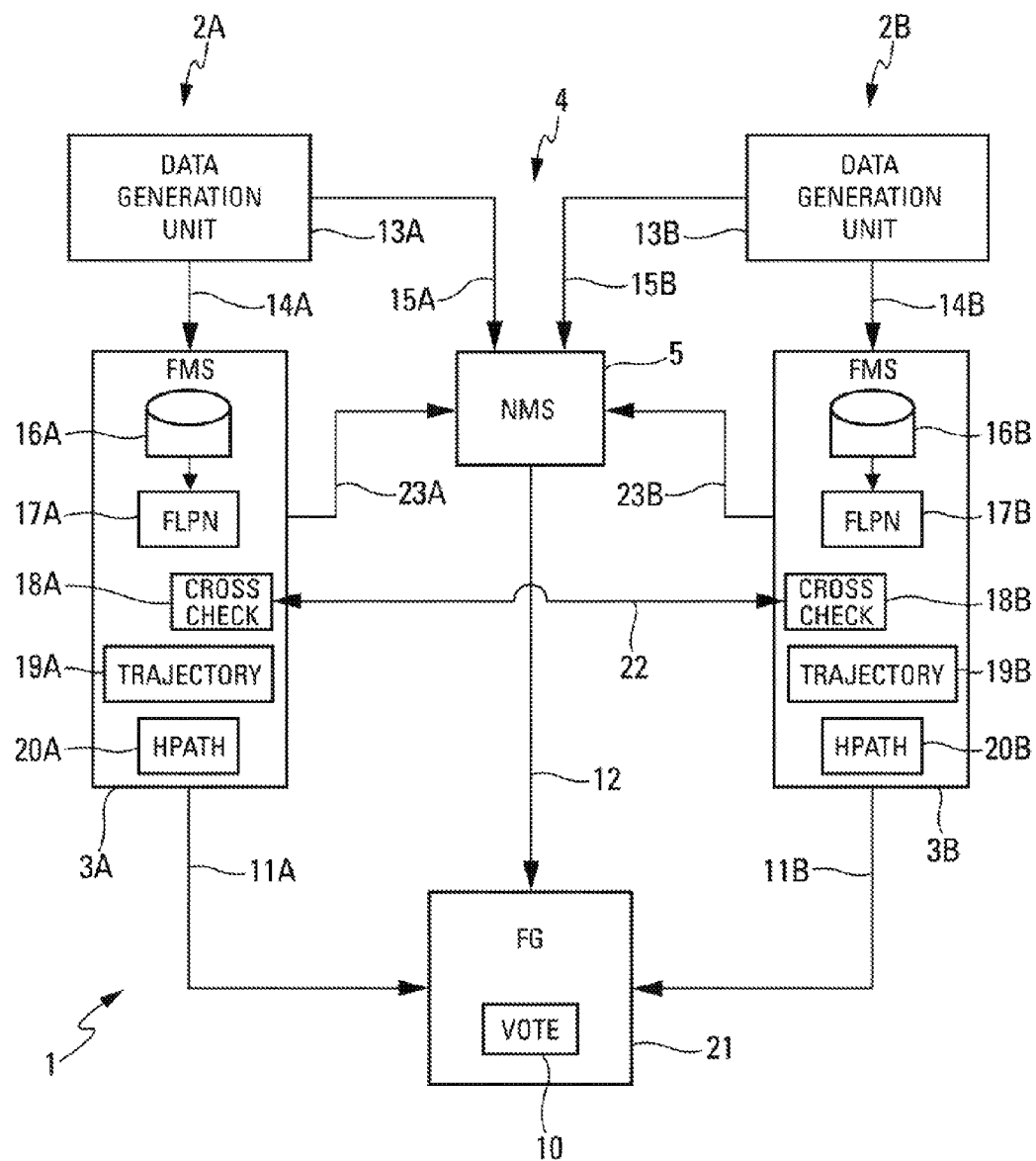
FIG. 1 is the block diagram of one particular embodiment of an aircraft flight management unit.

FIG. 1 shows diagrammatically a flight management unit 1 of an aircraft, in particular a transport aircraft, used to illustrate an embodiment of the invention.

This flight management unit 1, which is on board the aircraft, comprises two guidance subsystems 2A and 2B each including a respective flight management system (FMS) 3A and 3B. The two flight management systems 3A and 3B are independent and hosted in different hardware.

Each of said flight management systems 3A and 3B is configured (see below) at least to:

extract a flight plan from at least one associated navigation database;

construct a flight trajectory; and compute guidance commands (or set points) for the aircraft, notably roll control commands.

Said flight management unit 1 also comprises at least one monitoring unit 4 configured to monitor the flight management systems 3A and 3B.

Figure 2:
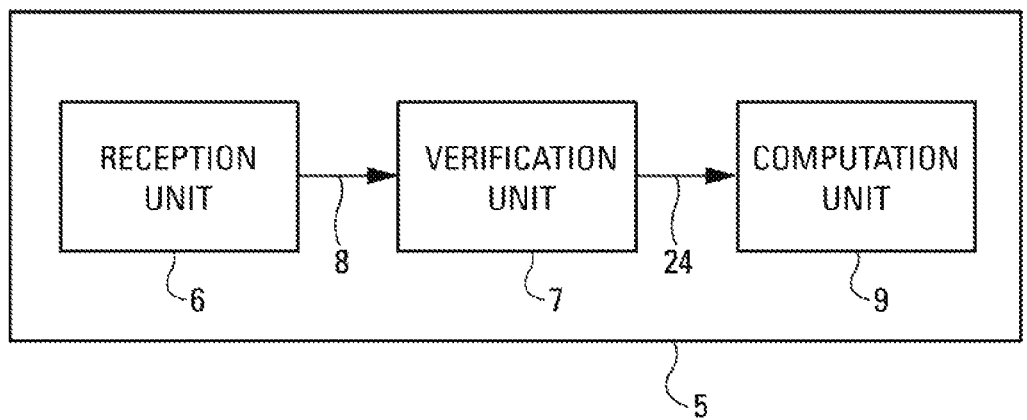
FIG. 2 is the block diagram of a monitoring system of the management unit from FIG. 1.

According to an embodiment of the invention, said monitoring unit 4 includes, as represented in FIG. 1:

a navigation monitoring system (NMS) 5, said monitoring system 5 comprising as shown in FIG. 2:

a reception unit 6, configured to receive a flight trajectory constructed by one of said flight management systems 3A and 3B together with a consolidated flight plan;

a verification unit 7, which is connected by a link 8 to the reception unit 6 and is configured to verify if the received flight trajectory is valid taking into account the received consolidated flight plan; the flight management system that constructed the flight trajectory is considered defective if the flight trajectory is considered invalid by the verification unit 7; and a computation unit 9, which is connected by a link 24 to the verification unit 7 and is configured, if the flight trajectory is validated, to compute a guidance command of the aircraft on the basis of that valid flight trajectory and a current position of the aircraft; and a comparison unit 10, for example a voter, configured to effect a comparison, notably in the form of a vote, between respective guidance commands, preferably roll control commands, computed by each of the two flight management systems 3A and 3B and by the computation unit 9 of the monitoring system 5 and received via respective links 11A, 11B and 12 so as to be able, if necessary, to detect and to identify a defective flight management system.

By defective flight management system is meant a flight management system that computes and issues at least one erroneous command (or guidance set point).

The monitoring system 5 may notably be a dedicated computer or implemented by an integrated modular avionics (IMA) computer.

Moreover, the verification unit 7 may notably correspond to a function implemented in software in the monitoring system 5. Likewise the computation unit 9.

In one particular embodiment, the aircraft is guided in accordance with data (and notably guidance commands) supplied by only one of said two guidance subsystems 2A and 2B, referred to as the active guidance subsystem. In another (preferred) embodiment, the median value of three data items (notably guidance commands) respectively generated by the flight management systems 3A and 3B and by the monitoring system 5 is retained and the aircraft can therefore be guided on the basis of data computed by the monitoring system 5 if necessary.

Moreover, the flight management unit 1 comprises a switch of the usual kind configured, should the monitoring unit 4 detect a defective flight management system (for example the flight management system 3A) and if the active guidance subsystem is that including that defective flight management system (the guidance subsystem 2A in this example), to generate a switching action consisting in activating the other of said two guidance subsystems 2A and 2B (namely the guidance subsystem 2B in this example).

The monitoring unit 4 is therefore able to isolate a defective flight management system in order to enable the crew to carry out an RNP operation with an acceptable response time.

The flight management system 3A, the flight management system 3B and the monitoring system 5 are all hosted in different hardware.

As represented in FIG. 1, each guidance subsystem 2A, 2B comprises a data generation unit 13A, 13B consisting of sensors of the usual kind for generating data and more specifically for determining (measuring, computing, etc.) the values of parameters linked to the status (position, speed, etc.) of the aircraft and its environment (temperature, etc.). These values are supplied via a link 14A, 14B from the data generation unit 13A, 13B to the corresponding flight management system 3A, 3B ("corresponding" meaning forming part of the same guidance subsystem 2A, 2B). The data generation unit 13A and 13B are also connected via links 15A and 15B to the monitoring system 5.

Each flight management system 3A, 3B extracts the RNP procedure from an (integrated) database 16A, 16B before the operation and loads it into a flight plan (FLPN) 17A, 17B.

The two flight plans are submitted (via a link 22) to at least one cross check unit 18A, 18B integrated for example into the corresponding flight management system and forming part of the monitoring unit 4. The cross check unit or units 18A, 18B compare the flight plans extracted by the flight management systems 3A and 3B to validate them and to obtain a consolidated flight plan that is notably sent to the monitoring system 5 via a link 23A, 23B.

The cross check unit 18A, 18B preferably performs a cyclic redundancy check (CRC).

Moreover, using a trajectory computation unit 19A, 19B, each flight management system 3A, 3B generates a predicted flight trajectory for the whole of the remainder of the flight based on meteorological conditions, aircraft performance and constraints linked to the (validated) flight plan. This data is updated:

at the time of a particular event (change of flight plan, for example); and/or periodically (updating of the meteorological data); and/or on approaching a transition.

Each flight management system 3A, 3B moreover generates guidance commands for the aircraft with the aid of a guidance command computation (HPATH) unit 20A, 20B.

Moreover, said flight management unit 1 comprises at least one flight guidance (FG) computer 21. In one particular embodiment (represented in FIG. 1), the comparison unit 10 is integrated into said flight guidance computer 21. Alternatively, the comparison unit 10 may be integrated into the monitoring system 5 and indicate to the flight guidance computer 21 the guidance subsystem to be considered.

The comparison unit 10 performs a vote between the guidance commands computed by each of said flight management systems 3A and 3B and the guidance command computed by the computation unit 9 of the monitoring system 5 and retains the median value.

In one particular embodiment (not shown), each of the two guidance subsystems 2A and 2B of the flight management unit 1 includes an FG type guidance computer. One of said guidance computers, namely the guidance computer of the active guidance subsystem, controls the usual servocontrol systems of the control surfaces of the aircraft to guide the aircraft according to the guidance set points.

Moreover, the reception unit 6 of the monitoring system 5 is configured to receive one of the following flight trajectories:

if the management unit is of the master/slave type with one of said flight management systems 3A and 3B being a master flight management system and the other of said flight management systems 3A and 3B being a slave flight management system, the flight trajectory constructed by the master flight management system;

if not, of the two flight trajectories respectively constructed by the two flight management systems 3A and 3B, the one that satisfies better a predetermined criterion, preferably a criterion of minimum distance relative to the flight plan.

The reception unit 6 receives this flight trajectory each time that the flight trajectory is modified.

Moreover, the verification unit 7 is configured to construct an RNP type corridor around the flight plan and to verify if the flight trajectory is situated inside that corridor.

In one preferred embodiment, the verification unit 7 is configured:
- to determine to which leg of the flight plan a sample of the verified flight trajectory belongs, the leg determined in this way being considered as a computation leg;
- to compute a cross track (or route offset) between that sample of the flight trajectory and said computation leg of the flight plan; and
- to compare this cross track to a field of possible values depending on at least one RNP value.

The previous steps are executed for a plurality of samples. The verification unit 7 is configured to validate the flight trajectory if, for all the samples considered, the cross tracks are situated inside the corresponding fields of values.

In one preferred embodiment, the field of values for a cross track corresponds to:
- [−RNP; +XTKmax], XTKmax being a maximum value depending on the two non-aligned successive rectilinear legs, if the flight trajectory part considered comprises said two non-aligned successive rectilinear legs; and
- [−RNP; +RNP], otherwise.

In one particular embodiment, the cross track is computed:
- for a rectilinear leg, by a scalar product and using Pythagoras' theorem; and
- for a curved leg, by the difference between the radius of curvature and the distance from the centre to the current point.

When the monitoring unit 4 detects the succession of two non-aligned rectilinear legs, the cross track constraint is loosened and the authorized cross track of the sample of the flight trajectory relative to the flight plan is between −0.1 NM=−RNP and +XTKmax.

Figure 3:
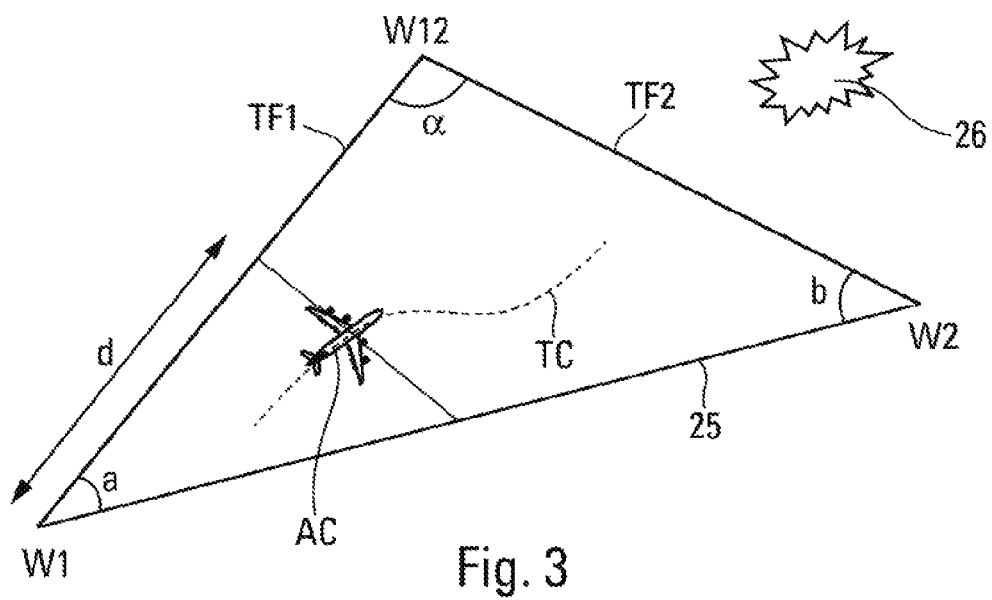
FIG. 3 is a diagram showing the position of an aircraft flying along a flight trajectory relative to a flight plan.

In the FIG. 3 example, the flight trajectory part represented comprises two rectilinear legs TF1 and TF2 between waypoints W1 and W12 and between waypoints W12 and W2. The rectilinear legs TF1 and TF2 are at an angle α (other than 180°) to each other. The aircraft AC is flying along a current trajectory TC.

When the active leg is the leg TF1, XTKmax satisfies the expression:

$$XTKmax = d \cdot \tan(a)$$

where d is the distance between the point W1 and the current position of the aircraft, tan denotes tangent and a is the angle between TF1 and the leg 25 passing through W1 and W2. Moreover, when the active leg is the leg TF2, the angle b is used.

An obstacle 26 to be avoided is also represented in FIG. 3.

Moreover, to compute the guidance command the computation unit 9 uses as the current position of the aircraft a position consolidated on the basis of GPS data and inertial data.

The flight management unit 1 is therefore based on a new architecture with two flight management systems 3A and 3B that monitors in particular the computation of the guidance commands (or set points).

Each of the flight management systems 3A and 3B is configured to perform the following computations in addition to generating guidance commands to slave the position of the aircraft to the trajectory:

- computation of the position of the aircraft;
- computation of the trajectory of the aircraft; and
- computation of the offset between the position and the trajectory of the aircraft.

In one particular embodiment, the monitoring unit 4 is configured to perform, in addition to monitoring the guidance commands (or set points) the usual monitoring operations according to computations performed by the flight management systems 3A and 3B:
- monitoring computation of a position of the aircraft;
- monitoring extraction of an RNP procedure from a navigation database (NDB) 16A, 16B, the RNP procedure being stored in the navigation database 16A, 16B of the flight management system 3A, 3B, and loading the procedure into a flight plan; and
- monitoring computation of a validated guidance command.

Figure 4:
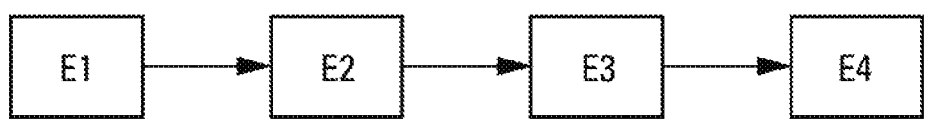
FIG. 4 is the flowchart of one particular embodiment of a monitoring method.

As described above, the monitoring unit 4 executes the following successive steps E1 to E4, as shown in FIG. 4 (in conjunction with FIGS. 1 and 2):
- a reception step E1, executed by the reception unit 6 and consisting in receiving a flight trajectory constructed by one of said flight management systems 3A and 3B, together with a consolidated flight plan;
- a verification step E2, executed by the verification unit 7 and consisting in verifying if the flight trajectory received is valid taking account of the consolidated flight plan received, the flight management system that constructed the flight trajectory being considered defective if the flight trajectory is considered invalid;
- a computation step E3, executed by the computation unit 9 and consisting in computing a guidance command of the aircraft, if the flight trajectory is considered valid, from that valid flight trajectory, and a current position of the aircraft; and
- a comparison step E4, executed by the comparison unit 10 and consisting in comparing the respective guidance commands computed by each of said flight management systems 3A, 3B and the guidance command computed by the computation unit 9 so as to be able, if necessary, to detect and to identify a defective flight management system.

There is therefore obtained a method (executed by the monitoring unit 4) of monitoring the flight management unit 1 that is fast, simple, of relatively low cost and effective.

An example of use is described hereinafter, in the particular case of an architecture imposed by the flight management system 3A, i.e. such that the flight guidance computer 21 always follows guidance commands from the flight management system 3A, unless they are not valid, and even if guidance commands from the flight management system 3A are not as good.

By way of illustration, this use consists of the following steps:
- the flight management system 3A sends the monitoring system 5 (via the link 23A) the predicted flight trajectory computed for the rest of the flight plan together with the flight plan that has previously been consolidated (with the aid of the cross check unit 18A, 18B). The consolidated flight plan (which is updated more often than the predicted trajectory) must be sent again on each sending of the predicted flight trajectory or trajectories, for reasons of synchronization and sequencing;
- the monitoring system 5 sequences the trajectory and the flight plan as and when necessary;

the monitoring system 5 computes the cross track of each sample of the predicted trajectory relative to the computation leg of the flight plan;

the monitoring system 5 validates the predicted flight trajectory if each sample leads to a cross track included in the authorized field of values;

the monitoring system 5 receives a consolidated position from the data generation unit 13A, 13B via the link 15A, 15B;

the monitoring system 5 computes (with the aid of the computation unit 9) a third guidance command (HPATH law) and sends it to the flight guidance computer 21; and the flight guidance computer 21 effects a vote with the aid of the comparison unit 10 (taking account of the median value).

Accordingly, in the event of a single fault, if the flight management system 3A is faulty:

if the flight management system 3A generates a bad predicted trajectory, that situation is detected by the monitoring system 5 which then bases itself (in order to generate its guidance command):

either on the last predicted trajectory generated by the flight management system 3A, which the monitoring system 5 had validated;

or on the trajectory predicted by the flight management system 3B, which the monitoring system 5 must then validate;

if the flight management system 3A generates a valid predicted flight trajectory but a bad guidance command, the monitoring system 5 generates a good guidance command and the commanded roll generated by the flight management system 3A is immediately passivated.

As described above, the flight management unit 1 therefore has an architecture based on two flight management systems 3A and 3B and monitoring (notably executed by the monitoring unit 4), to be able to carry out RNP 0,1 type operation. The monitoring unit 4 comprises a monitoring system 5 that is a much less costly computer than a flight management system. In particular, in order to lighten the monitoring system 5 compared to a flight management system, it does not include the following functions (which are present in a flight management system):

a navigation database;

extraction of flight plans from the navigation database;

construction of the flight trajectory from the flight plan and aircraft data.

This architecture makes it possible:

to avoid having to install a third flight management system (to serve as a third source of votes), which would be costly and complicated, and less certain in that the solution with three flight management systems is less robust in the face of common mode faults;

if necessary, to identify a defective flight management system (in the event of computation of erroneous guidance commands) making it possible to invalidate the defective flight management system and to continue to operate using the remaining flight management system that is not faulty, and if possible to resynchronize the defective flight management system to the non-defective flight management system;

to obtain a rapid response time with detection of possible failure of a flight management system even before it has been possible for the latter to generate the guidance command, which makes it possible to implement resynchronization of the faulty flight management system; and to employ instantaneous passivation of one of the three erroneous guidance commands.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft flight management unit, said flight management unit comprising first and second guidance subsystems each including a flight management system, each of said flight management systems being configured at least to extract a flight plan from at least one navigation database, to construct a flight trajectory and to compute guidance commands for the aircraft, said flight management unit also comprising at least one monitoring unit configured to monitor the flight management systems, wherein said monitoring system includes:

a monitoring unit comprising:

a reception unit configured to receive a flight trajectory, constructed by one of said flight management systems, and a consolidated flight plan;

a verification unit configured to verify if the flight trajectory received is valid taking account of the consolidated flight plan received, the flight management system that constructed the flight trajectory being considered defective if the flight trajectory is considered invalid by the verification unit; and a computation unit configured to compute, in the event of validation of the flight trajectory, a guidance command of the aircraft on the basis of the valid flight trajectory and a current position of the aircraft; and a comparison unit configured to compare the respective guidance commands computed by each of the first and second flight management systems and by said computation unit of the monitoring system so as to be able, if necessary, to detect and to identify a defective flight management system.

2. The flight management system according to claim 1, wherein said monitoring system includes a cross check unit for validating said consolidated flight plan with the aid of flight plans extracted by said flight management systems.

3. The flight management system according to claim 1, wherein the reception unit is configured to receive one of the following flight trajectories:

if one of said flight management systems is a master flight management system and the other of said flight management systems is a slave flight management system, the flight trajectory constructed by the master flight management system;

if not, of the respective flight trajectories constructed by the two flight management systems, the one that satisfies better a predetermined criterion.

4. The flight management system according to claim 1, wherein said each of said flight management systems and said monitoring system are hosted in different hardware.

5. The flight management system according to claim 1, further comprising at least one guidance computer, wherein said comparison unit is integrated into said guidance computer.

6. A method of monitoring a flight management system of an aircraft, said flight management system comprising first and second guidance subsystems each including a flight management system, each of said flight management systems being configured at least to extract a flight plan from at least one navigation database to construct a flight trajectory and to compute guidance commands for the aircraft,
the method comprising:
a receiving step executed by a reception unit and including receiving a flight trajectory constructed by one of said flight management systems and a consolidated flight plan;
a verification step executed by a verification unit and including verifying if the flight trajectory received is valid taking account of the consolidated flight plan received, the flight management system that constructed the flight trajectory being considered defective if the flight trajectory is considered invalid;
a computation step executed by a computation unit if the flight trajectory is considered valid and including computing a guidance command of the aircraft based on this valid flight trajectory and a current position of the aircraft; and
a comparison step executed by a comparison unit and including comparing the respective guidance commands computed by each of said flight management systems and the guidance command computed in said computation step so as to be able, if necessary, to detect and to identify a defective flight management system.

7. The method according to claim 6, wherein the receiving step includes receiving the flight trajectory each time that the flight trajectory is modified.

8. The method according to claim 6, further comprising a validation step including determining said consolidated flight plan with the aid of flight plans extracted by said flight management systems.

9. The method according to claim 8, wherein the validation step consists in executing a cyclic redundancy check.

10. The method according to claim 6, wherein the verification step includes constructing an RNP type corridor around the flight plan and verifying if the flight trajectory is situated in that corridor.

11. The method according to claim 6, wherein the verification step comprises:
determining a leg of the flight plan to which belongs a sample of the verified flight trajectory, the leg determined in this way being considered as a computation leg;
computing a cross track between the flight trajectory sample and said computation leg of the flight plan;
comparing the cross track to a field of possible values depending at least on an RNP value, the preceding steps being executed for a plurality of samples; and
validating the flight trajectory if, for all the samples considered, the cross tracks are situated inside the corresponding fields of values.

12. The method according to claim 11, wherein the field of values for a cross track corresponds to:
[−RNP; +XTKmax], XTKmax being a maximum value depending on two non-aligned successive rectilinear legs, if the flight trajectory part considered comprises said two non-aligned successive rectilinear legs; and
[−RNP; +RNP] otherwise.

13. The method according to claim 6, wherein the computation step utilizes a consolidated position as the current position of the aircraft to compute the guidance command.

14. The method according to claim 6, wherein the comparison step includes exercising a vote between the respective guidance commands computed by each of said flight management systems and the guidance command computed in said computation step and retaining the median value.

15. An aircraft comprising:
a flight management system comprising:
first and second guidance subsystems each including a flight management system, each of said flight management systems being configured at least to extract a flight plan from at least one navigation database, to construct a flight trajectory and to compute guidance commands for the aircraft, said flight management unit also comprising at least one monitoring unit configured to monitor the flight management systems, wherein said monitoring system includes:
a monitoring unit comprising:
a reception unit configured to receive a flight trajectory, constructed by one of said flight management systems, and a consolidated flight plan;
a verification unit configured to verify if the flight trajectory received is valid taking account of the consolidated flight plan received, the flight management system that constructed the flight trajectory being considered defective if the flight trajectory is considered invalid by the verification unit; and
a computation unit configured to compute, in the event of validation of the flight trajectory, a guidance command of the aircraft on the basis of the valid flight trajectory and a current position of the aircraft; and
a comparison unit configured to compare the respective guidance commands computed by each of the first and second flight management systems and by said computation unit of the monitoring system so as to be able, if necessary, to detect and to identify a defective flight management system.

* * * * *